US008813248B2

(12) United States Patent
Purvis

(10) Patent No.: US 8,813,248 B2
(45) Date of Patent: Aug. 19, 2014

(54) SYSTEM AND METHOD FOR AUTHENTICATING A USER

(75) Inventor: Chris Purvis, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 370 days.

(21) Appl. No.: 13/170,681

(22) Filed: Jun. 28, 2011

(65) Prior Publication Data

US 2013/0007874 A1    Jan. 3, 2013

(51) Int. Cl.
*G06F 21/31* (2013.01)
*G06F 21/32* (2013.01)

(52) U.S. Cl.
CPC ............... *G06F 21/32* (2013.01); *G06F 21/31* (2013.01)
USPC ............ 726/28; 726/2; 726/3; 726/4; 726/26; 726/27; 726/19; 726/21; 713/169; 713/172; 713/178

(58) Field of Classification Search
None
See application file for complete search history.

(56) References Cited

U.S. PATENT DOCUMENTS

| | | | |
|---|---|---|---|
| 7,770,013 B2* | 8/2010 | Rhoads et al. | 713/176 |
| 2005/0210267 A1* | 9/2005 | Sugano et al. | 713/186 |
| 2006/0206930 A1* | 9/2006 | Parashi et al. | 726/8 |
| 2007/0024698 A1* | 2/2007 | Engstrom et al. | 348/14.01 |
| 2007/0033649 A1* | 2/2007 | Henriksen | 726/20 |
| 2008/0059331 A1* | 3/2008 | Schwab | 705/27 |
| 2009/0210939 A1* | 8/2009 | Xu et al. | 726/19 |
| 2011/0161232 A1* | 6/2011 | Brown | 705/71 |
| 2012/0084571 A1* | 4/2012 | Weis et al. | 713/184 |

OTHER PUBLICATIONS

"Confident Multifactor Authentication; Two-Factor Authentication Using Images;" Confident Technologies; http://www.confident-technologies.com/products/mobile-phone-authentication-factor; 1 page, printed Jan. 23, 2012.
Vladimir Katalov; "Nikon Image Authentication System: Compromised;" Advanced Password Cracking—Insight; http://blog.crackpassword.com/2011/04/nikon-image-authentication-system-compromised/; 10 pages; printed Jan. 23, 2012, Apr. 28, 2011.
Takada, Tetsuji, et al.; "Awase-E: Image-based Authentication for Mobile Phones using User's Favorite Images;" http://www.netaro.info/~zetaka/publications/papers/awasee-MobileHC103.pdf; 5 pages, printed Jan. 23, 2012.

* cited by examiner

*Primary Examiner* — Jung Kim
*Assistant Examiner* — Adrian Stoica
(74) *Attorney, Agent, or Firm* — Michael A. Springs

(57) ABSTRACT

According to an embodiment, a system is provided comprising a memory and a processor. The memory may be operable to store a master image associated with a user account. The master image may comprise an image of a physical, non-living object. The processor may be coupled to the memory and may be operable to receive a request to perform a transaction associated with the user account. The processor may be further operable to receive an image that is scanned in real-time in conjunction with the request to perform the transaction. The processor may be further operable to compare the scanned image with the master image associated with the user account and to perform the transaction if the scanned image is substantially similar to the master image.

18 Claims, 4 Drawing Sheets

SYSTEM AND METHOD FOR AUTHENTICATING A USER

TECHNICAL FIELD

This disclosure relates generally to authentication, and more particularly to a system for authenticating a user using images of physical objects.

BACKGROUND

As the demand for digital transactions has grown, so has the demand for better security and authentication of data. Users may perform digital transactions involving sensitive data frequently, for example, to pay bills, purchase goods, access their bank accounts, etc. When such transactions are requested from an institution, the institution may prompt the users to authenticate themselves through passwords or keys. However, passwords, keys, and the algorithms used to generate them may be stolen by hackers and pirates. In order to protect sensitive data and to stay ahead of hackers and pirates, institutions should consider more advanced security and authentication methods.

SUMMARY

According to an embodiment, a system is provided comprising a memory and a processor. The memory may be operable to store a predetermined master image associated with a user account. The master image may comprise an image of a physical, non-living object. The processor may be coupled to the memory and may be operable to receive a request to perform a transaction associated with the user account. The processor may be further operable to receive an image that is scanned in real-time in conjunction with the request to perform the transaction. The processor may be further operable to compare the scanned image with the master image associated with the user account and to perform the transaction if the scanned image is substantially similar to the master image.

Technical advantages of certain embodiments of the present disclosure include providing better authentication and security measures for users. Specifically, the user may protect his account information with an authentication token that is not easily stolen. For example, the user may select a physical, non-living object, such as a personal possession, as his authentication token. During each iteration of the authentication process, the user may scan the physical, non-living object in real-time to authenticate himself. It may be more difficult for pirates and hackers to steal this authentication token because only the user knows which physical, non-living object is associated with his account. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
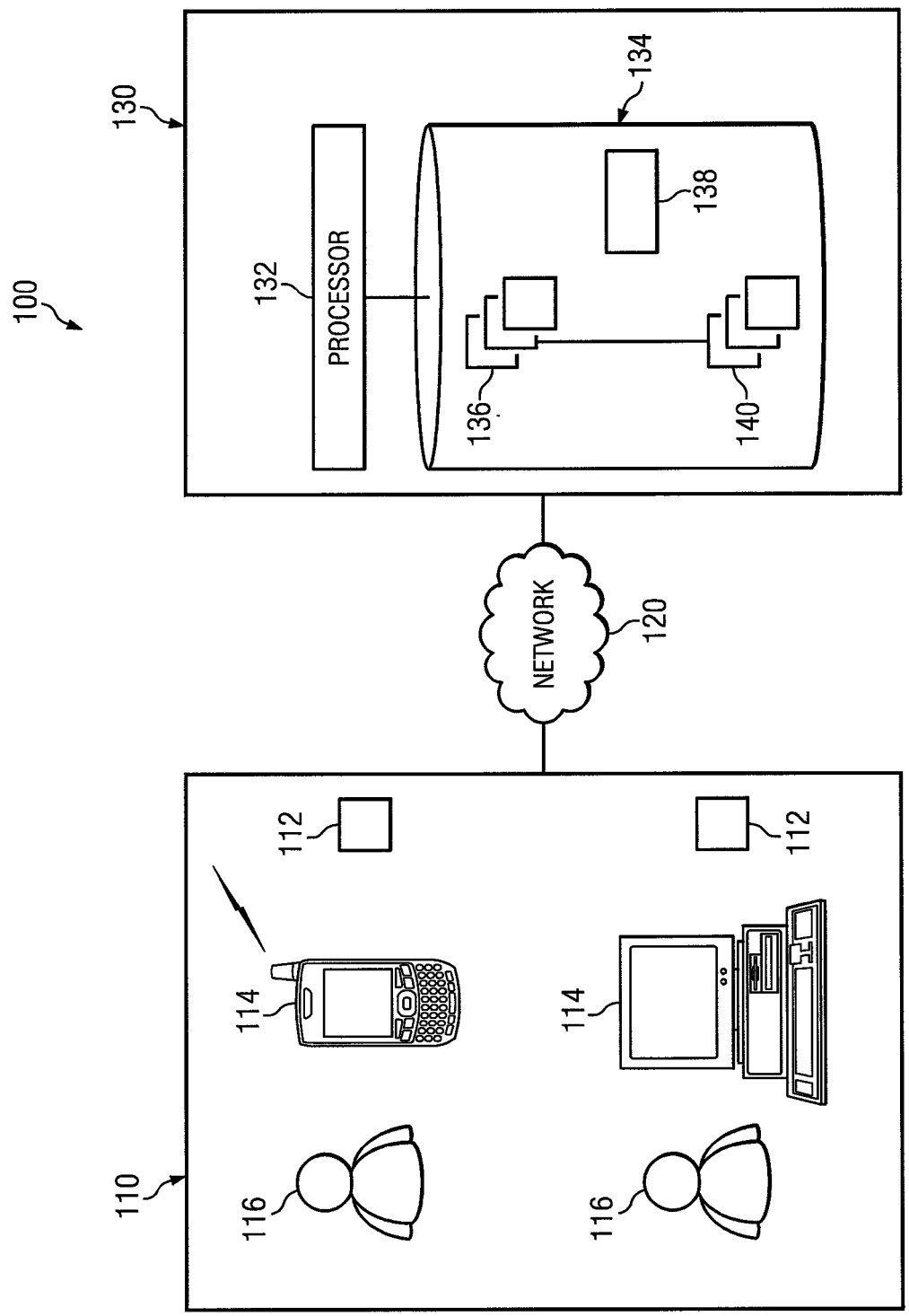
FIG. 1 is a schematic diagram of one embodiment of a system for authenticating a user.

FIG. 1 is a schematic diagram of one embodiment of a system 100 for authenticating a user 116. As provided in FIG. 1, system 100 may include a user environment 110, a network 120, and a server 130. User environment 110 and server 130 may be coupled to network 120. In general, users 116 in user environment 110 may authenticate themselves with server 130 through network 120 using computing device 114. Each user 116 may be associated with a user account 136 that is further associated with a master image 140. Master image 140 may be an image of an object, such as, for example, a physical non-living object pre-selected by user 116. When user 116 wishes to perform a particular transaction, for example, a large financial transaction or a financial transaction involving sensitive data, server 130 may prompt user 116 to authenticate himself. During the authentication process, user 116 may use computing device 114 to scan the physical, non-living object in real-time to produce an image 112 and to communicate image 112 to server 130. Server 130 may then compare the scanned image 112 with the master image 140 associated with the user's account 136. If the scanned image 112 is substantially similar to master image 140, then server 130 may perform the transaction requested by user 116.

In particular embodiments, system 100 may include user environment 110. User environment 110 may include users 116 and computing devices 114. As an example and not by way of limitation, computing device 114 may be a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100. Computing device 114 may also include a user interface, such as a display, a microphone, keypad, or other appropriate terminal equipment usable by a user 116. In particular embodiments, computing device 114 may be configured to capture images 112 of objects by scanning the objects in real-time. In some embodiments, an application executed by computing device 114 may perform the scan. Although this disclosure describes computing device 114 with respect to particular types of devices, this disclosure contemplates computing device 114 being any suitable device.

System 100 includes network 120. Mobile computing device 112 and computing device 114 may communicate with server 130 through network 120. This disclosure contemplates any suitable network 120 operable to facilitate communication between the components of system 100, such as user environment 110 and server 130. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In particular embodiments, system 100 may include server 130. Server 130 may include a processor 132 and a memory 134. Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. In particular embodiments, memory 134 may be configured to store information associated with user accounts 136. As an example and not by way of limitation, memory 134 may be configured to store master images 140 associated with user accounts 136. A particular master image 140 may be used as an authentication token associated with a corresponding user account 136. In particular embodiments, the master image 140 for a given user account 136 may be an image of a physical, non-living object pre-selected by the user 116 associated with that user account 136. Memory 134 may further store image recognition software 138 that is operable, when executed by processor 132, to compare a master image 140 with a scanned image 112 from the user 116.

Processor 132 may be coupled to memory 134. Processor 132 may control the operation and administration of server 130 by processing information received from network 120 and memory 134. Processor 132 may include any hardware and/or software that operates to control and process information. For example, processor 132 may execute image recognition software 138 to compare scanned images 112 with master images 140. Processor 132 may be a programmable logic device, a microcontroller, a microprocessor, any suitable processing device, or any suitable combination of the preceding.

In particular embodiments, processor 132 may be configured to receive a request to perform a transaction associated with a user account 136, which has a master image 140 associated with it. As an example and not by way of limitation, the transaction may be a financial transaction such as a withdrawal of money from account 136, or a transaction involving sensitive data such as changing the address or phone number associated with account 136. In particular embodiments, master image 140 may be predetermined. As an example and not by way of limitation, master image 140 may be selected by a user 116 associated with account 136 prior to processor 132 receiving the request to perform the transaction. Processor 132 may be further configured to prompt user 116 to provide a real-time scanned image 112 of a physical, non-living object in response to the request to perform the transaction. In some embodiments, processor 132 may be configured to receive scanned image 112 in conjunction with the request to perform the transaction. If the transaction is being performed by a legitimate user 116 with respect to that user's user account 136, then the user 116 will know what physical, non-living object the user had pre-selected as the master image 140. As a result, the user 116 will know what physical, non-living object to scan in real-time in response to the request for authentication. Because this authentication technique uses a real-time scan of a physical, non-living object that only user 116 knows, it provides enhanced security for the underlying transaction.

Processor 132 may be further configured to compare real-time scanned image 112 with master image 140. Processor 132 may be configured to perform the transaction if scanned image 112 is substantially similar to master image 140, otherwise, processor 132 may be configured to reject the transaction. In particular embodiments, processor 132 may execute software stored in memory 134 to perform any of the functions disclosed herein. As an example and not by way of limitation, processor 132 may be configured to execute image recognition software 138 stored in memory 134 to compare scanned image 112 with master image 140.

As an example and not by way of limitation, user 116 may be a bank customer wishing to withdraw a large sum of money from account 136. User's 116 account 136 may be associated with a master image 140, such as an image of the user's 116 wristwatch, as pre-selected by user 116. After user 116 requests to withdraw the large sum of money, server 130 may prompt user 116 to authenticate himself prior to performing the transaction. User 116 may respond by first entering a password and/or key generated by a key generator, such as, for example, an authenticator attached to the user's 116 keychain. If the password and/or key match the password and/or key associated with the user's 116 account 136, then server 130 may prompt user 116 to send a real-time scan of the physical, non-living object associated with master image 140 and known only by user 116. User 116 may then use an application on computing device 114 to scan his wristwatch and to send the scanned image 112 to server 130. Server 130 may use image recognition software 138 to compare scanned image 112 with master image 140. If scanned image 112 and master image 140 are substantially similar, then server 130 may perform the transaction, otherwise, server 130 may reject or refuse the transaction.

In operation, system 100 may provide a secure authentication process for users 116. Each user 116 may set up his account 136 to accommodate the authentication process through an enrollment process. Then user 116 may use this authentication process during future transactions.

Referring to the enrollment process, user 116 may set up his account 136 to accommodate the authentication process by sending server 130 a request to enroll. In particular embodiments, user 116 may be prompted to authenticate himself (e.g., through entering a password associated with user account 136) before server 130 will respond to the request to enroll. Server 130 may then prompt user 116 to scan an image of a physical object pre-selected by user 116. In particular embodiments, the physical object may be a non-living object such as, for example, a wristwatch. In particular embodiments, server 130 may associate this image to user account 136 so that this image may become the master image 140 for account 136. Once user account 136 is associated with master image 140, account 136 may be considered "enrolled" and ready to accommodate the more secure authentication process. In particular embodiments, user 116 may change master image 140 associated with his account 136 from time to time. In some embodiments, server 130 may require user 116 to change master image 140 associated with his account 136 periodically.

Referring to the authentication process, user 116 may wish to perform a transaction, such as a financial transaction or a transaction involving sensitive user data. In order to provide better security for the transaction, user 116 may wish to use the authentication process. User 116 may request the transaction and be prompted by server 130 to provide a real-time scan of the physical, non-living object within the master image 140 associated with the user's account 136. User 116 may then use computing device 114 to scan the physical, non-living object in real-time and to send the scanned image 112 to serve 130. Server 130 may then compare scanned image 112 with master image 140. If scanned image 112 is substantially similar to master 140 image, server 130 may perform the requested transaction, otherwise, server 130 may refuse or reject the transaction. In particular embodiments, server 130 may use scanned image 112 as part of a larger authentication process. As an example and not by way of limitation, server 130 may prompt user 116 to enter a password and/or a key associated with account 136 in addition to prompting user 116 to provide a real-time scan of the physical object within master image 140.

In particular embodiments, computing device 114 may be configured to produce real-time scanned image 112. In some embodiments, computing device 114 may execute an application that scans physical objects to produce scanned image 112. As an example and not by way of limitation, the application may operate to control a scanner or a camera on computing device 114 that scans the physical object. In particular embodiments, computing device 114 may scan the object in real-time. As an example and not by way of limitation, each time user 116 uses the authentication process, computing device 114 may scan the object and send the scanned image 112 resulting from that scan to server 130. Scanned images 112 used in previous authentication attempts may not be used again. In particular embodiments, computing device 114 may associate a timestamp with scanned image 112. Server 130 may inspect the timestamp to ensure that scanned image 112 was scanned within an acceptable timeframe to be considered scanned in real-time.

In particular embodiments, server 130 may use image recognition software 138 to compare scanned image 112 with master image 140. In particular embodiments, image recognition software 138 may be operable, when executed, to determine if scanned image 112 is substantially similar to master image 140 within a certain degree or threshold. As an example and not by way of limitation, image recognition software may be operable, when executed, to determine if the object in scanned image 112 is the same object in master image 140 by examining the bits encoding the images. In particular embodiments, image recognition software 138 may be operable, when executed, to account for differences in scanned image 112 and master image 140 such as, for example, differences in lighting, angle, and focus.

In particular embodiments, system 100 may provide better security for a user's account 136 by associating a master image 140 with the user's account 136. Because user 116 selects and is conceivably the only person who knows about the physical, non-living object used to generate master image 140, it may be difficult for hackers or pirates to determine what the physical, non-living object is. In particular embodiments, because user 116 may change the master image 140 associated with account 136 by selecting a new physical, non-living object, it may be difficult for hackers or pirates to determine what the physical, non-living object is. As an example and not by way of limitation, a hacker or pirate may easily steal a key generator from user 116 or the key generation algorithm from server 130, but it may be difficult for the hacker or pirate to determine what physical, non-living object user 116 selected to include in master image 140. Furthermore, because server 130 requests user 116 to scan the physical, non-living object in real-time during every iteration of the authentication process, it may be difficult for a hacker or pirate to access the user's account 136 even though the hacker or pirate may intercept and/or duplicate a scanned image 112 previously used.

Figure 2:
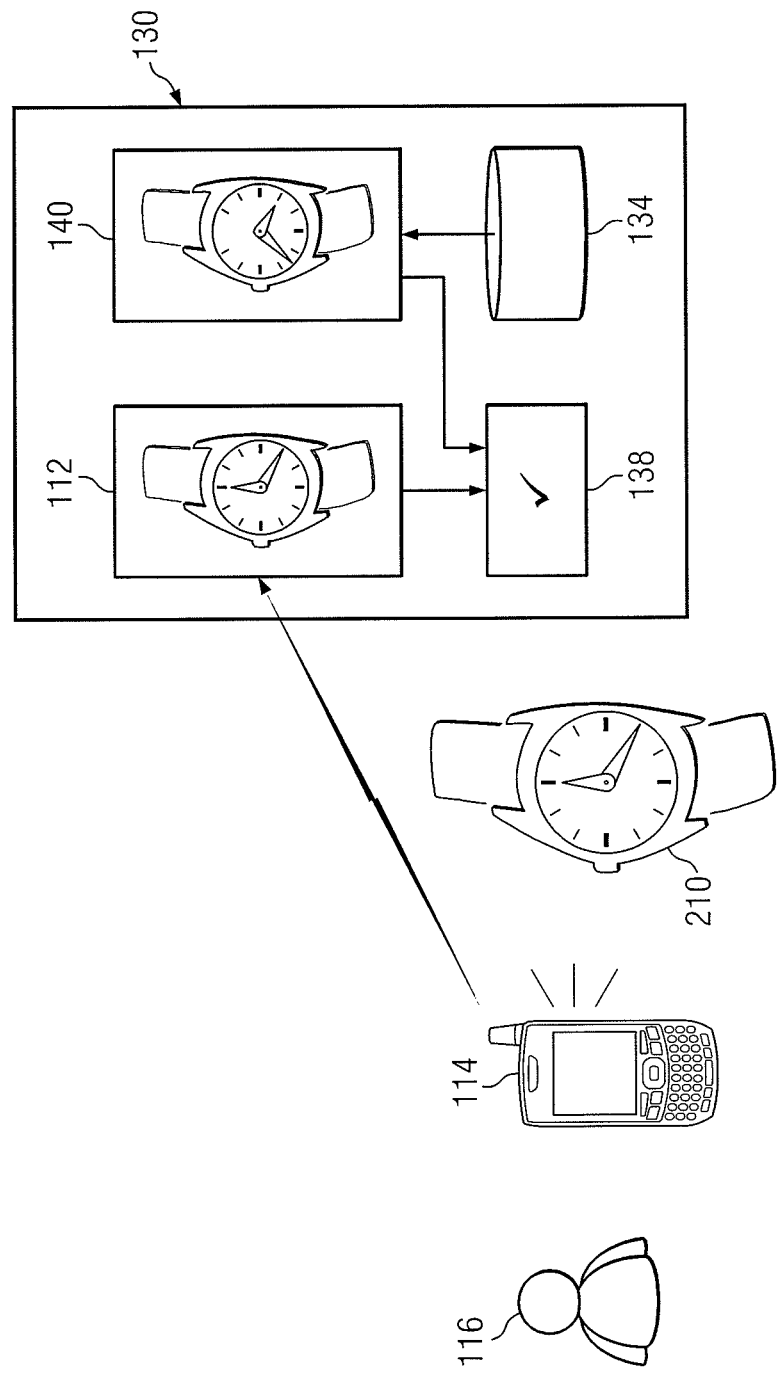
FIG. 2 is an illustration of a user authenticating himself using the system of FIG. 1.

FIG. 2 is an illustration of a user 116 authenticating himself using the system of FIG. 1. As provided in FIG. 2, user 116 may use computing device 114 to scan physical object 210 to produce scanned image 112 that is sent to server 130. Server 130 may use image recognition software 138 to compare scanned image 112 with master image 140, which may be stored in memory 134.

In particular embodiments, as part of an authentication process, server 130 may prompt user 116 to provide scanned image 112. In response, user 116 may use computing device 114 to scan physical object 210. In particular embodiments, physical object 210 may be a physical, non-living object in user's 116 possession. As an example and not by way of limitation, physical object 210 may be the user's 116 wristwatch. In particular embodiments, scanned image 112 may be a real-time scan. As an example and not by way of limitation, server 130 may prompt user 116 to scan physical object 210 during each iteration of the authentication process. Server 130 may refuse scanned images 112 that were used during previous authentication processes and were therefore not scanned in real-time.

In particular embodiments, computing device 114 may be configured to scan physical object 210 in real-time. Computing device 114 may then produce and send scanned image 112 to server 130. Computing device 114 may execute an application to perform any of the functions disclosed herein. As an example and not by way of limitation, computing device 114 may be a cell phone executing a mobile banking application that is operable to control a camera on computing device 114 to scan physical object 210. The application may have been downloaded onto computing device 114 and may be associated with a particular bank. The application may facilitate transactions and authentication between user 116 and server 130. For example, when user 116 wishes to perform a financial transaction with the bank using the cell phone, the application may prompt the user to scan the physical, non-living object associated with the master image 140 associated with the user's 116 user account 136. The application may control the phone's camera to scan a physical, non-living object in real-time and may send the scanned image 112 to server 130 for comparison with master image 140. If server 130 determines scanned image 112 and master image 140 are substantially similar, then server 130 may perform the financial transaction.

In particular embodiments, server 130 may receive scanned image 112. Server 130 may retrieve master image 140 from memory 134. Master image 140 may be associated with user's 116 account. In particular embodiments, server 130 may use image recognition software 138 to compare scanned image 112 with master image 140. If scanned image 112 is substantially similar to master image 130, then server 130 may consider user 116 to be authenticated. In particular embodiments, scanned image 112 may not be identical to master image 140 and yet still be considered substantially similar by image recognition software 138. As an example and not by way of limitation, scanned image 112 may be an image of a wristwatch taken in the afternoon. However, master image 140 may be an image of the wristwatch taken in the early morning. As a result, the wristwatch in scanned image 112 may display a different time than the wristwatch in master image 140. Image recognition software 138 may be configured to recognize that the wristwatch in scanned image 112 is the same wristwatch as the wristwatch in master image 140 even though the wristwatches in the two images display different times. In particular embodiments, server 130 may store scanned image 112 into memory 134.

Figure 3:
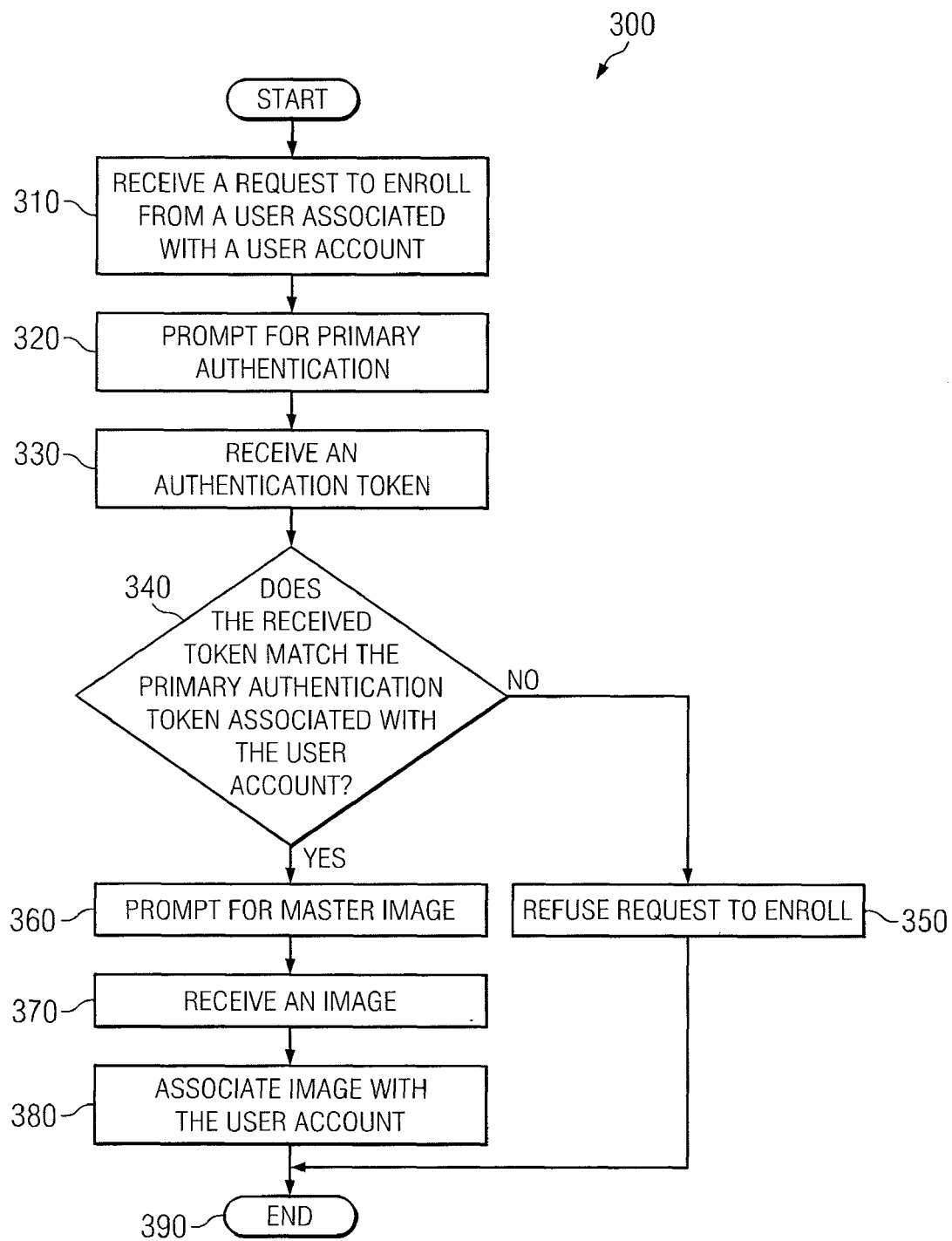
FIG. 3 is a flowchart illustrating one embodiment of an enrollment process for the system of FIG. 1.

FIG. 3 is a flowchart illustrating one embodiment of an enrollment process 300 for the system of FIG. 1. As provided in FIG. 3, enrollment process 300 may begin by receiving a request to enroll from a user associated with a user account 136 at step 310. Enrollment process 300 may continue by prompting for primary authentication in step 320. At step 330, enrollment process 300 may receive an authentication token. As an example and not by way of limitation, the token may be a password or key. At step 340, enrollment process 300 may determine if the received token matches the primary authentication token associated with the user account. If the token does not match the primary authentication token, then enrollment process 300 may continue, at step 350, by refusing the request to enroll. If the token does match the primary authentication token, then enrollment process 300 may continue to step 360 by prompting for a master image 140. Enrollment process 300 may continue by receiving an image at step 370. In particular embodiments, the image may be an image of a physical, non-living object. Enrollment process 300 may continue by associating the image with the user account at step 380. After association with the user account, the received image will be the master image 140 associated with the user account. In particular embodiments, a user may change the master image 140 associated with user account 136 outside of enrollment process 300. As an example and not by way of limitation, user 116 may send a request to change master image 140, authenticate himself through a primary authentication token, and supply a new image to be associated with user account 136. As another example and not by way of limitation, user 116 may send a request to change master image 140, send a real-time scanned image of the physical, non-living object within master image 140, and supply a new image to be associated with user account 136. Enrollment process 300 may conclude at step 390.

Figure 4:
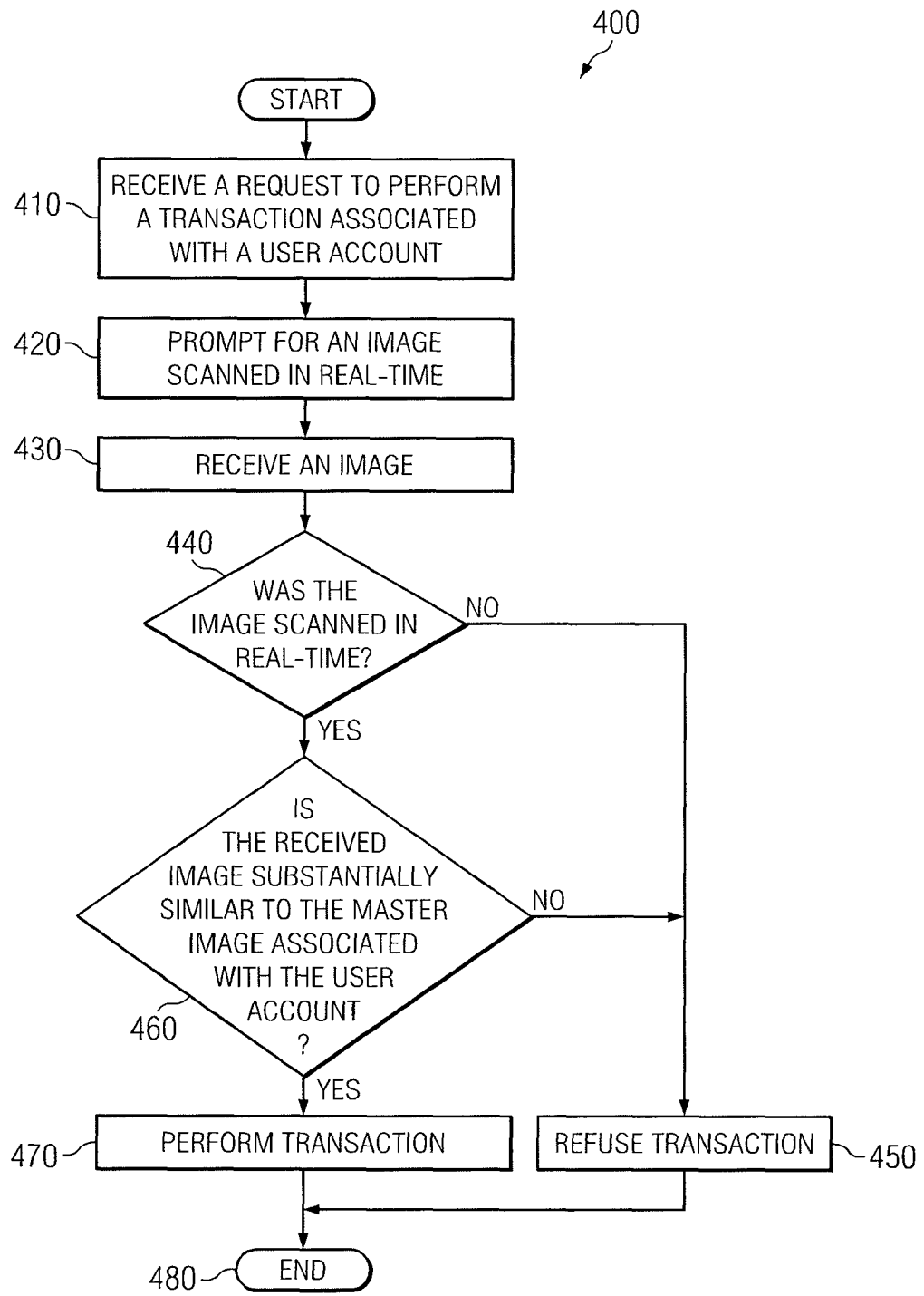
FIG. 4 is a flowchart illustrating one embodiment of an authentication process for the system of FIG. 1.

FIG. 4 is a flowchart illustrating one embodiment of an authentication process 400 for the system of FIG. 1. As provided in FIG. 4, authentication process 400 may begin by receiving a request to perform a transaction associated with a user account 136 at step 410. Authentication process 400 may continue by prompting for an image scanned in real-time at step 420. At step 430, authentication process 400 may receive an image. In particular embodiments, the received image may be an image of a physical, non-living object. At step 440, authentication process 400 may determine if the received image was scanned in real-time. In particular embodiments, a timestamp associated with the received image may be examined to make this determination. If the received image was not scanned in real-time, authentication process 400 may continue by refusing the transaction at step 450. If the received image was scanned in real-time, authentication process 400 may continue to step 460 by determining if the received image is substantially similar to the master image 140 associated with the user account 136. In particular embodiments, master image 140 may be an image of a physical, non-living object. If the received image is not substantially similar to the master image 140, then authentication process 400 may continue by refusing the transaction at step 450. If the received image is substantially similar to the master image 140, then authentication process 400 may continue by performing the transaction at step 470. Authentication process 400 may conclude at step 480.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system comprising:
a memory operable to store:
    a predetermined master image of a physical non-living object, the master image associated with a user account;
    a master password associated with the user account; and
    a first key associated with the user account; and
a processor coupled to the memory and operable to:
    receive a request to perform a transaction associated with the user account;
    receive a first password;
    receive a second key generated by a hardware device;
    compare the first password with the master password to determine that the first password matches the master password;
    compare the second key with the first key to determine that the second key matches the first key;
    communicate, in response to the determination that the first password matches the master password and to the determination that the second key matches the first key, a prompt;
    receive, in response to the prompt, an image of a second physical non-living object, the image scanned in real-time in conjunction with the request to perform the transaction;
    compare the image with the master image associated with the user account to determine whether the second physical non-living object is the physical non-living object;
    perform the transaction if the second physical non-living object is determined to be the physical non-living object; and
    change the master image to be of a third physical non-living object different from the physical non-living object in response to receiving a request to change the master image and to determining a second password matches the master password.

2. The system of claim 1, wherein the image is received with a timestamp indicating when the image was scanned, and the processor further operable to determine if the image was scanned in real-time according to the timestamp.

3. The system of claim 1, wherein comparing the image with the master image comprises examining a first plurality of bits encoding the image and a second plurality of bits encoding the master image.

4. The system of claim 1, wherein the image is scanned by an application executed by a computing device associated with a user associated with the user account.

5. The system of claim 1, the processor further operable to associate the master image with the user account in conjunction with a request from a user associated with the user account prior to receiving the request to perform the transaction.

6. The system of claim 1, wherein the master image is selected by a user associated with the user account prior to the processor receiving the request to perform the transaction.

7. A system comprising:
an application executed by a first hardware processor and operable to;
    send a request to perform a transaction associated with a user account;
    send a first password;
    send a key generated by a hardware device;
    receive a prompt; and send, in response to the prompt an image of a physical non-living object scanned in real-time in conjunction with the request to perform the transaction; and
a second hardware processor operable to:
    store a master image of a second physical non-living object, the master image associated with a user account;
    store a master password associated with the user account;
    store a first key associated with the user account;
    receive the request to perform the transaction associated with the user account;
    receive the first password;
    receive the key generated by the hardware device;
    compare the first password with the master password to determine that the first password matches the master password;

compare the key generated by the hardware device with the first key to determine that the key generated by the hardware device matches the first key;

communicate, in response to the determination that the first password matches the master password and to the determination that the hey generated by the hardware device matches the first key, the prompt;

receive, in response to the prompt, the image that is scanned in real-time in conjunction with the request to perform the transaction;

compare the image with the master image associated with the user account to determine whether the physical non-living object is the second physical non-living object;

perform the transaction if the physical non-living object is determined to be the second physical non-living object; and change the master image to be of a third physical non-living object different from the physical non-living object in response to receiving a request to change the master image and to determining a second password matches the master password.

8. The system of claim 7, wherein the image is communicated with a timestamp indicating when the image was scanned, and the second processor further operable to determine if the image was scanned in real-time according to the timestamp.

9. The system of claim 7, wherein comparing the image with the master image comprises comparing examining a first plurality of bits encoding the image and a second plurality of bits encoding the master image.

10. The system of claim 7, wherein the image is scanned by an application executed by the first processor, the first processor associated with a user associated with the user account.

11. The system of claim 7, the second processor further operable to associate the master image with the user account in conjunction with a request from a user associated with the user account prior to receiving the request to perform the transaction.

12. The system of claim 7, wherein the master image is selected by a user associated with the user account prior to receiving the request to perform the transaction.

13. A method comprising:
storing a master image of a physical non-living object, the master image associated with a user account;
storing a master password associated with the user account;
storing a first key associated with the user account;
receiving a request to perform a transaction associated with the user account;
receiving a first password;
receiving a second key generated by a hardware device;
comparing the first password with the master password to determine that the first password matches the master password;
comparing the second key with the first key to determine that the second key matches the first key;
communicating, in response to the determination that the first password matches the master password and to the determination that the second key matches the first key, a prompt;
receiving, in response to the prompt, an image of a second physical non-living object, the image scanned in real-time in conjunction with the request to perform the transaction;
comparing the image with the master image associated with the user account to determine whether the physical non-living object is the second physical non-living object;
performing the transaction if the physical non-living object is determined to be the second physical non-living object; and
changing the master image to be of a third physical non-living object different from the physical non-living object in response to receiving a request to change the master image and to determining that a second password matches the master password.

14. The method of claim 13, wherein the image comprises a timestamp, the method further comprising determining if the scanned image was scanned in real-time according to the timestamp.

15. The method of claim 13, wherein comparing the image with the master image comprises examining a first plurality of bits encoding the image and a second plurality of bits encoding the master image.

16. The method of claim 13, wherein the image is scanned by an application executed by a computing device associated with a user associated with the user account.

17. The method of claim 13, the method further comprising associating the master image with the user account in conjunction with a request from a user associated with the user account prior to receiving the request to perform the transaction.

18. The method of claim 13, wherein the master image is selected by a user associated with the user account prior to receiving the request to perform the transaction.

* * * * *